(12) United States Patent
Wei et al.

(10) Patent No.: US 12,476,496 B2
(45) Date of Patent: Nov. 18, 2025

(54) LOW-VOLTAGE STARTUP CIRCUIT FOR LOW-INDUCTANCE WIRELESS CHARGING SYSTEM AND WIRELESS CHARGING SYSTEM

(71) Applicant: CHENGDU CONVENIENTPOWER SEMICONDUCTOR CO. LTD, Sichuan (CN)

(72) Inventors: Wei Wei, Sichuan (CN); Senlin Hou, Sichuan (CN); Jianping Wang, Sichuan (CN); Zhitong Guo, Sichuan (CN)

(73) Assignee: CHENGDU CONVENIENTPOWER SEMICONDUCTOR CO. LTD, Sichuan (CN)

( * ) Notice: Subject to any disclaimer, the term of this patent is extended or adjusted under 35 U.S.C. 154(b) by 69 days.

(21) Appl. No.: 17/757,210

(22) PCT Filed: Apr. 25, 2021

(86) PCT No.: PCT/CN2021/089652
§ 371 (c)(1),
(2) Date: Jun. 10, 2022

(87) PCT Pub. No.: WO2022/217643
PCT Pub. Date: Oct. 20, 2022

(65) Prior Publication Data
US 2023/0369915 A1    Nov. 16, 2023

(30) Foreign Application Priority Data

Apr. 12, 2021 (CN) .......................... 202110387299.0

(51) Int. Cl.
*H01M 10/46* (2006.01)
*H02J 7/00* (2006.01)
(Continued)

(52) U.S. Cl.
CPC .......... *H02J 50/70* (2016.02); *H02J 7/00308* (2020.01); *H02J 50/10* (2016.02); *H02J 2207/20* (2020.01)

(58) Field of Classification Search
CPC .......... H02J 7/00308; H02J 7/06; H02J 50/12; H02J 50/005; H02J 2207/20; G06F 9/44; G06F 1/26; G06F 2211/1097
(Continued)

(56) References Cited

U.S. PATENT DOCUMENTS 9,973,008 B1 * 5/2018 Leabman ................ H02J 50/20
11,757,289 B2 * 9/2023 Carré ........................ H02J 7/00
320/134

FOREIGN PATENT DOCUMENTS

CN    201550072 U    8/2010
CN    104079157 A    10/2014
(Continued)

OTHER PUBLICATIONS

Ding, Debin et al.; "The Low-Voltage Start up and High Efficiency Boost DC/DC Converter Design Based on Charge Pump"; Chinese Journal of Electron Devices; vol. 36, No. 2; Apr. 2013; pp. 211-216.

*Primary Examiner* — Edward Tso
(74) *Attorney, Agent, or Firm* — NKL Law; Allen Xue

(57) ABSTRACT

A low-voltage startup circuit for a low-inductance wireless charging system includes a voltage input port Vrect, a common grounding port VSS, a PMOS driver signal control module pgate_ctrl_logic, a NMOS MN1 and a PMOS MP1, a Vmax power supply selection control module vmax_sel, a power-on reset module por, a low-voltage band-gap reference circuit lv_bgr, a rectifier logic control module boost_logic, a rectifier SR and a rectifier output under_voltage protection control module vrect_uvlo. The low-voltage
(Continued)

startup circuit can normally start the MCU at the Vrect voltage under a low-voltage condition (1.4V).

6 Claims, 1 Drawing Sheet

(51) Int. Cl.
*H02J 50/10* (2016.01)
*H02J 50/70* (2016.01)

(58) Field of Classification Search
USPC ....... 320/107, 108, 127, 135, 136, 152, 162, 320/163
See application file for complete search history.

(56) References Cited

FOREIGN PATENT DOCUMENTS

| | | | |
|---|---|---|---|
| CN | 107370355 | A | 11/2017 |
| CN | 107508458 | A | 12/2017 |
| JP | 2000133481 | A | 5/2000 |

\* cited by examiner

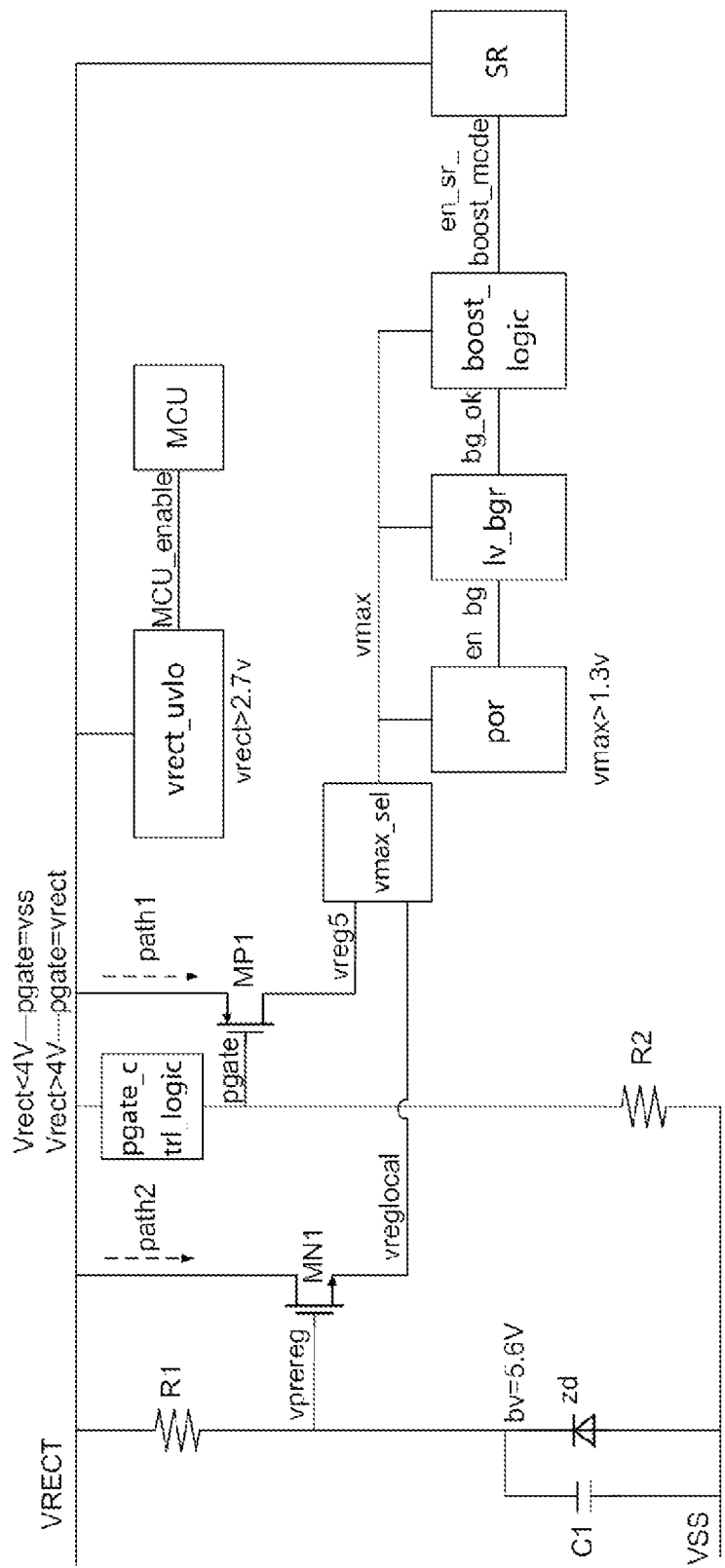

LOW-VOLTAGE STARTUP CIRCUIT FOR LOW-INDUCTANCE WIRELESS CHARGING SYSTEM AND WIRELESS CHARGING SYSTEM

CROSS REFERENCE TO RELATED APPLICATIONS

This application is a U.S. national stage entry of PCT International Application No. PCT/CN2021/089652, filed on Apr. 25, 2021, which claims the priority of Chinese application No. 202110387299.0, entitled "low-voltage startup circuit for low-inductance wireless charging system and wireless charging system", filed on Apr. 12, 2021, the content of which is incorporated herein by reference in its entirety.

TECHNICAL FIELD

The invention relates to the technical field of wireless charging, specifically to a low-voltage startup circuit for a low-inductance wireless charging system and the wireless charging system.

BACKGROUND

With the continuous improvement of wireless charging power, the load current continues to increase, but the increase of current leads to the doubling of the power loss of the coil, which limits the improvement of wireless charging power. The power loss of the coil is strongly related to the impedance of the coil. Therefore, the power loss can be reduced by reducing the coil impedance, and the power loss of the coil is proportional to the inductance. Thus, the impedance of the coil can be reduced by reducing the coil inductance, so as to improve the current capability and the power, but the reduction of coil inductance will reduce the couple voltage and the charging area. When the couple is poor, the normal startup voltage of a chip cannot be satisfied.

SUMMARY

The present invention is to provide a low-voltage startup circuit for a low-inductance wireless charging system and the wireless charging system, so as to solve the problem that the normal startup voltage of the chip cannot be satisfied when the coupling voltage of the receiver is lower due to reduction of the coil inductance.

The present invention provides a low-inductance wireless charging system, wherein the low-voltage startup circuit is used to control the rectifier SR to enter the voltage-double rectification mode when the receiver of the wireless charging system is under a low-voltage condition; the low-voltage startup circuit comprises a voltage input port Vrect, a common grounding port VSS, a PMOS driver signal control module pgate_ctrl_logic, a NMOS MN1 and a PMOS MP1, a Vmax power supply selection control module vmax_sel, a power-on reset module por, a low-voltage band-gap reference circuit lv_bgr, a rectifier voltage-doubler logic control module boost_logic, a rectifier SR and a rectifier output under_voltage protection control module vrect_uvlo;

The Vmax power supply selection control module vmax_sel has a first input port and a second input port; the first input port is connected to the voltage input port Vrect via the drain and source of the MOS MP1 and the gate of the MIP is connected to the common grounding port VSS via R2, and connected to the voltage input port Vrect via the PMOS driver signal control module pgate_ctrl_logic on the other side; the second input port is connected to the voltage input port Vrect via the drain and source of the MOS MN1, and the gate of the MOS MN1 is connected between the voltage input port Vrect and the common grounding port VSS;

The output port of the Vmax power supply selection control module vmax_sel is connected with the power-on reset module por, low-voltage band-gap reference circuit lv_bgr and the power supply port of rectifier voltage-double logic control module boost_logic, respectively; the signal output port of the power-on reset module por is connected to a the signal input port of the rectifier SR via the low-voltage band-gap reference circuit lv_bgr and the rectifier voltage-doubler logic control module boost_logic; the signal output port of the rectifier SR is connected to the voltage input port Vrect, and connected to the MCU via the rectifier output undervoltage protection control module vrect_uvlo.

Furthermore, the low-voltage startup circuit for the low-inductance wireless charging system further comprising a rectifier circuit connected between the voltage input port Vrect and the common grounding port VSS.

Furthermore, the rectifier circuit comprises a resistor R1, a capacitor C1 and a zener diode zd; the voltage input port Vrect is connected to the common grounding port VSS via the resistor R1 and the zener diode zd, the capacitor C1 is parallel with the zener diode zd.

Furthermore, the low-voltage startup circuit for the low-inductance wireless charging system further comprises a resistor R2, the resistor R2 is connected between the PMOS driver signal control module pgate_ctrl_logic and the common grounding port VSS.

The present invention further provides A method of the low-voltage startup circuit for the low-inductance wireless charging system as above, comprising the following steps:
S1. Generating input voltages at the first input port and the second input port of the Vmax power supply selection control module vmax_sel, respectively:
(1) The PMOS driver signal control module pgate_CTR1_logic is used to compare the voltage of Vrect at the voltage input port with 4V:
When Vrect<4V, the PMOS driver signal control module pgate_ctrl_logic control the gate of MP1 to be VSS, and MP1 is turned on, then the input signal at the first input port of the Vmax power supply selection control module vmax_sel is Vrect;
When Vrect>4V, the PMOS driver signal control module pgate_ctrl_logic control the gate of MP1 to be Vrect, and MP1 is turned off, the input signal at the first input port of the Vmax power supply selection control module vmax_sel is 0;
(2) The voltage input port Vrect generates a voltage at the gate of the MOS MN1 named vprereg, and the forward voltage drop of the MOS MN1 is vth, thus the input signal at the second input port vreglocal of the Vmax power supply selection control module vmax_sel is vprereg-vth;
S2. The Vmax power supply selection control module vmax_sel selects the max volatge of vreg5 and vreglocal as the input source vmax of the power-on reset module por, low-voltage band-gap reference circuit lv_bgr and the rectifier voltage-doubler logic control module boost_logic;
S3. The power-on reset module por determines whether vmax is greater than 1.3V. When vmax>1.3V, the control signal en_bg is output to lv_bgr, the low-voltage band-gap reference circuit, and bg_ok is output to boost_logic, the rectifier voltage_doubler logic control module.

S4. After the control signal bg_ok is out, the rectifier voltage-doubler logic control module boost_logic outputs a voltage double control signal en_sr_boost_mode to the rectifier SR to make the rectifier SR to work in voltage-doubler rectification mode and make the voltage of Vrect double;

S5. The rectifier output undervoltage protection control module vrect_uvlo determines whether the Vrect is greater than 2.7V. If so, it outputs the startup signal MCU_enable to the MCU to make the MCU startup and work normally.

The present invention further realizes a wireless charging system, and the wireless charging system comprises a transmitter and a receiver; the receiver is provided with the low-voltage startup circuit for the low-inductance wireless charging system; the low-voltage startup circuit is used to control the rectifier SR to enter the voltage-doubler rectification mode when the receiver of the wireless charging system is under a low-voltage condition.

To sum up, after the above technical solution is used, the advantages of the present invention are as follows:

The low-voltage startup circuit of the present invention is used for the low-inductance wireless charging system, and can control the rectifier SR to work in the voltage-doubler rectification mode under a low-voltage condition (1.4V), so as to provide a voltage of startup the MCU at the receiver of the wireless charging system.

DESCRIPTION OF DRAWINGS

In order to illustrate the technical solutions in the embodiments of the present invention more clearly, figures in the embodiments will be introduced below briefly. It should be understood that the figures described below only show some embodiments of the present invention, and they shall not be construed as restrictions to the scope. Those of ordinary skill in the art may also obtain other figures on the basis of those figures without creative work.

FIG. 1 is a schematic diagram of a low-voltage startup circuit for a low-inductance wireless charging system according to an embodiment of the present invention.

DETAILED DESCRIPTION

The technical solutions of the embodiments of the present invention will be described clearly and completely as follows in combination with the figures of these embodiments for a clear understanding of the purposes, technical solutions and advantages of the present invention. Apparently, the embodiments described are only some, not all of the embodiments of the present invention. Generally, the components in the embodiments of the present invention described and shown in the figures herein may be arranged and designed in various configurations.

Therefore, the detailed descriptions of the embodiments of the present invention provided in the figures are not intended to limit the scope of the present invention, and the embodiments are only certain embodiments of the present invention. On the basis of the embodiments of the present invention, other embodiments obtained by an ordinary person skilled in the art without creative work also fall into the protection scope of the present invention.

Embodiment

As shown in FIG. 1, the embodiment provides A low-voltage startup circuit for a low-inductance wireless charging system, wherein the low-voltage startup circuit is used to control the rectifier SR to enter the voltage-double rectification mode when the receiver of the wireless charging system is under a low-voltage condition; the low-voltage startup circuit comprises a voltage input port Vrect, a common grounding port VSS, a PMOS driver signal control module pgate_ctrl_logic, a NMOS MN1 and a PMOS MP1, a Vmax power supply selection control module vmax_sel, a power-on reset module por, a low-voltage band-gap reference circuit lv_bgr, a rectifier voltage-doubler logic control module boost_logic, a rectifier SR and a rectifier output under_voltage protection control module vrect_uvlo;

The Vmax power supply selection control module vmax_sel has a first input port and a second input port; the first input port is connected to the voltage input port Vrect via the drain and source of the MOS MP1 and the gate of the MIP is connected to the common grounding port VSS via R2, and connected to the voltage input port Vrect via the PMOS driver signal control module pgate_ctrl_logic on the other side; the second input port is connected to the voltage input port Vrect via the drain and source of the MOS MN1, and the gate of the MOS MN1 is connected between the voltage input port Vrect and the common grounding port VSS;

The output port of the Vmax power supply selection control module vmax_sel is connected with the power-on reset module por, low-voltage band-gap reference circuit lv_bgr and the power supply port of rectifier voltage-double logic control module boost_logic, respectively; the signal output port of the power-on reset module por is connected to the signal input port of the rectifier SR via the low-voltage band-gap reference circuit lv_bgr and the rectifier voltage-doubler logic control module boost_logic; the signal output port of the rectifier SR is connected to the voltage input port Vrect, and connected to the MCU via the rectifier output undervoltage protection control module vrect_uvlo.

In some embodiments, the low-voltage startup circuit for the low-inductance wireless charging system further comprising a rectifier circuit connected between the voltage input port Vrect and the common grounding port VSS. Specifically, the rectifier circuit comprises a resistor R1, a capacitor C1 and a zener diode zd; the voltage input port Vrect is connected to the common grounding port VSS via the resistor R1 and the zener diode zd, the capacitor C1 is parallel with the zener diode zd.

Furthermore, the low-voltage startup circuit for the low-inductance wireless charging system further comprises a resistor R2, the resistor R2 is connected between the PMOS driver signal control module pgate_ctrl_logic and the common grounding port VSS.

The principle is described in detail through a method of the low-voltage startup circuit for the low-inductance wireless charging system. The method comprises the following steps:

S1. Generating input voltages at the first input port and the second input port of the Vmax power supply selection control module vmax_sel, respectively:

(1) The PMOS driver signal control module pgate_ctrl_logic is used to compare the voltage of Vrect at the voltage input port with 4V:

When Vrect<4V, the PMOS driver signal control module pgate_ctrl_logic control the gate of MP1 to be VSS, and MP1 is turned on, then the input signal at the first input port of the Vmax power supply selection control module vmax_sel is Vrect, as shown in path1 in FIG. 1;

When Vrect>4V, the PMOS driver signal control module pgate_ctrl_logic control the gate of MP1 to be Vrect, and MP1 is turned off, the input signal at the first input port of the Vmax power supply selection control module vmax_sel is 0;

(2) The voltage input port Vrect generates a voltage at the gate of the MOS MN1 named vprereg, and the forward voltage drop of the MOS MN1 is vth, thus the input signal at the second input port vreglocal of the Vmax power supply selection control module vmax_sel is vprereg-vth, as shown in path2 in FIG. 2. Generally, vth is approximately 1V, i.e., vreglocal will have a voltage only when Vrect reaches at least 1V;

S2. The Vmax power supply selection control module vmax_sel selects the max volatge of vreg5 and vreglocal as the input source vmax of the power-on reset module por, low-voltage band-gap reference circuit lv_bgr and the rectifier voltage-doubler logic control module boost_logic;

S3. The power-on reset module por determines whether vmax is greater than 1.3V. When vmax>1.3V, the control signal en_bg is output to lv_bgr, the low-voltage band-gap reference circuit, and bg_ok is output to boost_logic, the rectifier voltage_doubler logic control module;

S4. After the control signal bg_ok is out, the rectifier voltage-doubler logic control module boost_logic outputs a voltage double control signal en_sr_boost_mode to the rectifier SR to make the rectifier SR to work in voltage-doubler rectification mode and make the voltage of Vrect double;

S5. The rectifier output undervoltage protection control module vrect_uvlo determines whether the current Vrect is greater than 2.7V. If so, it outputs the startup signal MCU_enable to the MCU to make the MCU startup and work normally.

It can be seen from the above contents that, the low-voltage startup circuit of the present invention can make the chip send a logic signal to enter the voltage_doubler mode under the condition of lower Vrect voltage (1.4V), and break the limitation of MN1 conduction threshold, so as to control the rectifier to work in the voltage-doubler rectification mode when the vrect voltage reaches 1.4V, double the Vrect voltage, and make the MCU at the receiver of the wireless charging system work, consequently to complete the startup of the low-inductance wireless charging system.

Based on the above low-voltage startup circuit for the low-inductance wireless charging system, the embodiment further realizes a wireless charging system, and the wireless charging system comprises a transmitter and a receiver; the receiver is provided with the low-voltage startup circuit for the low-inductance wireless charging system; the low-voltage startup circuit is used to control the rectifier SR to enter the voltage-doubler rectification mode when a receiver of the wireless charging system is under a low-voltage condition;

Only preferred embodiments of the invention are described above, but not limited to the invention. For a person skilled in the art, the invention may take on various alterations and changes. Any modification, equivalent replacement and improvement made within the spirit and rule of the present invention shall be incorporated in the protection scope of the present invention.

The invention claimed is:
1. A low-voltage startup circuit for a low-inductance wireless charging system, comprising:
a voltage input port Vrect, a common grounding port VSS, a PMOS driver signal control module pgate_ctrl_logic, a NMOS MN1 having a drain, a source, and a gate, and a MOS MP1 having a drain, a source, and a gate, a Vmax power supply selection control module vmax_sel, a power-on reset module por, a low-voltage band-gap reference circuit lv_bgr, a rectifier voltage-doubler logic control module boost_logic, a rectifier SR and a rectifier output undervoltage protection control module vrect_uvlo, wherein:

the Vmax power supply selection control module vmax_sel has a first input port and a second input port; the first input port is connected to the voltage input port Vrect via the drain and the source of the MOS MP1 and the gate of the MOS MP1 is electrically connected to the common grounding port VSS, and to the voltage input port Vrect via the PMOS driver signal control module pgate_ctrl_logic; the second input port is connected to the voltage input port Vrect via the drain and the source of the NMOS MN1, and the gate of the MOS MN1 is connected between the voltage input port Vrect and the common grounding port VSS;

an output port of the Vmax power supply selection control module vmax_sel is connected with the power-on reset module por, the low-voltage band-gap reference circuit lv_bgr and a power supply port of the rectifier voltage-doubler logic control module boost_logic; and a signal output port of the power-on reset module por is connected to a signal input port of the rectifier SR via the low-voltage band-gap reference circuit lv_bgr and the rectifier voltage-doubler logic control module boost_logic; a signal output port of the rectifier SR is connected to the voltage input port Vrect, and connected to a MCU via the rectifier output undervoltage protection control module vrect_uvlo.

2. The low-voltage startup circuit for the low-inductance wireless charging system according to claim 1, further comprising a rectifier circuit connected between the voltage input port Vrect and the common grounding port VSS.

3. The low-voltage startup circuit for the low-inductance wireless charging system according to claim 2, wherein the rectifier circuit comprises a resistor R1, a capacitor C1 and a zener diode zd, and the voltage input port Vrect is connected to the common grounding port VSS via the resistor R1 and the zener diode zd, and the capacitor C1 is arranged in parallel with the zener diode zd.

4. The low-voltage startup circuit for the low-inductance wireless charging system according to claim 3, further comprises a resistor R2 connected between the PMOS driver signal control module pgate_ctrl_logic and the common grounding port VSS.

5. The low-voltage startup circuit for the low-inductance wireless charging system according to claim 1, configured to carry out steps of:
S1: generating an input voltage at the first input port and the second input port of the Vmax power supply selection control module vmax_sel, wherein:
when Vrect<4V, the PMOS driver signal control module pgate_ctrl_logic controls the gate of MP1 to be VSS, and MP1 is turned on, then the input signal at the first input port of the Vmax power supply selection control module vmax_sel vreg5 is Vrect;
when Vrect>4V, the PMOS driver signal control module pgate_ctrl_logic controls the gate of MP1 to be Vrect, and MP1 is turned off, the input signal at the first input port of the Vmax power supply selection control module vmax_sel vreg5 is 0; and
the voltage input port Vrect generates a voltage at the gate of the MOS MN1 named vprereg, and the forward voltage drop of the MOS MN1 is vth, and the input signal at the second input port vreglocal of the Vmax power supply selection control module is vmax_sel, wherein vmax_sel=vprereg−vth;

S2: the Vmax power supply selection control module vmax_sel selects a lager voltage between vreg5 and vreglocal as the input source vmax of the power-on reset module por, the low-voltage band-gap reference circuit lv_bgr, and the rectifier voltage-doubler logic control module boost_logic;

S3: the power-on reset module por determines whether vmax is greater than 1.3V, when vmax>1.3V, a control signal en_bg is output to lv_bgr, the low-voltage band-gap reference circuit, and a control signal bg_ok is output to the rectifier voltage-doubler logic control module boost_logic;

S4: after receiving a control signal bg_ok, the rectifier voltage-doubler logic control module boost_logic outputs a voltage double control signal en_sr_boost_mode to the rectifier SR to make the rectifier SR to operate in a voltage-doubler rectification mode and to double a voltage of Vrect; and S5: the rectifier output undervoltage protection control module vrect_uvlo determines a value of Vrect, and when Vrect is greater than 2.7V, sending a startup signal MCU_enable to the MCU.

6. A wireless charging system, comprising a transmitter and a receiver, wherein the receiver is provided with the low-voltage startup circuit for the low-inductance wireless charging system according to claim 1.

\* \* \* \* \*